United States Patent

Osthoff et al.

[11] Patent Number: 5,725,419
[45] Date of Patent: Mar. 10, 1998

[54] APPARATUS FOR REMOVING EXCESS MATERIAL FROM WORKPIECES

[76] Inventors: Erwin Osthoff, Hohenstrasse 19, D-71711 Steinheim; Horst Osthoff, Kirchenweinbergstrasse 131, D-71672 Marbach, both of Germany

[21] Appl. No.: 556,110

[22] Filed: Nov. 9, 1995

[30] Foreign Application Priority Data

Nov. 9, 1994 [DE] Germany .............. 44 39 735.6

[51] Int. Cl.$^6$ .............................................. B24B 9/00
[52] U.S. Cl. .............................. 451/241; 451/182; 451/457; 451/453
[58] Field of Search .................... 451/344, 182, 451/241, 245, 260, 282, 457, 454, 453, 359, 361, 363

[56] References Cited

U.S. PATENT DOCUMENTS

| | | | |
|---|---|---|---|
| 2,486,850 | 11/1949 | Ives | 451/241 |
| 2,944,374 | 7/1960 | Persson | 451/260 |
| 3,341,976 | 9/1967 | Pace, Sr. | 451/241 |
| 4,173,849 | 11/1979 | Mar | 451/360 |
| 4,376,603 | 3/1983 | Hudgins | 451/241 |
| 5,495,988 | 3/1996 | Follese et al. | 451/282 |

*Primary Examiner*—Robert A. Rose
*Attorney, Agent, or Firm*—Karl Hormann

[57] ABSTRACT

An apparatus for removing excess material, such as spur bits or sprues, from workpieces, provided with a support surface having a guide channel therein for receiving excess material therein for guiding to a rotatably driven removal tool having a peripheral cutting or grinding segment submerged in a slot in the support surface and which is mounted for selective movements in parallel as well as normal to its rotational axis to allow adjustments to compensate for changes in the size or kind of tool as a result of wear or replacement. While not so limited in its application, the apparatus is of particular use for removing spur bits or sprues from workpieces.

15 Claims, 3 Drawing Sheets

APPARATUS FOR REMOVING EXCESS MATERIAL FROM WORKPIECES

BACKGROUND OF THE INVENTION

1. Field of the Invention

The present invention, in general, relates to an apparatus for removing excess material from workpieces and, more particularly, to an apparatus for removing spur bits and sprues from workpieces produced by turning in a lathe or by injection molding techniques, in as safe a manner to operating personnel as possible.

2. Background of the Prior Art

Spur bits and sprues are inherent in articles produced on lathes or by injection molding machines, and as a rule they require removal by additional working steps subsequent to the manufacture. Such additional operations are disadvantageous as they increase manufacturing costs and introduce certain hazards into the manufacturing process, for removal of the spur bits and sprues, being one of the finishing processes of a product, as a rule is performed manually by expert personnel of considerable skill, by cutting, grinding, filing, sometimes even lapping, and similar operations. Such operations, particularly if performed with hand-held power tools, induce certain risks in respect of injury to personnel and damage to the product.

German Utility Model DE-GM 7,533,450 discloses an apparatus for removing burrs from workpieces placed on a support bench and moved by a grinding wheel along a depth control stop, the grinding wheel operating in an inclined disposition beneath a slot formed between the support bench and depth control stop. Not only is such an apparatus unsuitable for removing excess material from workpiece surfaces, but it also presents a safety hazard to operating personnel.

OBJECTS OF THE INVENTION

It is a primary object of the invention to provide an apparatus for removing excess material from workpieces which is as safe to operate as possible.

Another object of the invention resides in the provision of a power driven apparatus of the kind referred to in which the operating tool is virtually inaccessible while in operation.

Yet another object of the invention is to provide an apparatus for removing excess material from workpieces which utilizes a mass-produced standard hand-tool as a power source.

It is a further object of the invention to provide an apparatus of the kind referred to which provides adjustable guide means to accommodate workpieces of different sizes.

BRIEF SUMMARY OF THE INVENTION

In the accomplishment of these and other objects the invention provides an apparatus for removing excess material from workpieces, including a tool powered by a rotary drive and a support for moving workpieces relative to the tool in a predetermined orientation. Preferably, the removal operation is performed by the workpiece being moved into engagement with the peripheral surface of a tool mounted below the support. Advantageously, the peripheral surface of the tool is positioned in a recess formed within the support, without protruding above the surface thereof, the recess being disposed to intersect a guide slot or channel provided in the support and adapted for insertion of the excess material, such as a spur bit or sprue, of the workpiece.

Other objects and advantages of the invention will in part be obvious and will in part appear hereinafter.

BRIEF DESCRIPTION OF THE SEVERAL DRAWINGS

The novel features which are considered to be characteristic of the invention are set forth with particularity in the appended claims. The invention itself, however, in respect of its structure, construction and layout, as well as manufacturing techniques, together with other objects and advantages thereof will be best understood from the following description of preferred embodiments when read with reference to the appended drawings, in which:

DETAILED DESCRIPTION OF THE PREFERRED EMBODIMENT

Figure 1:
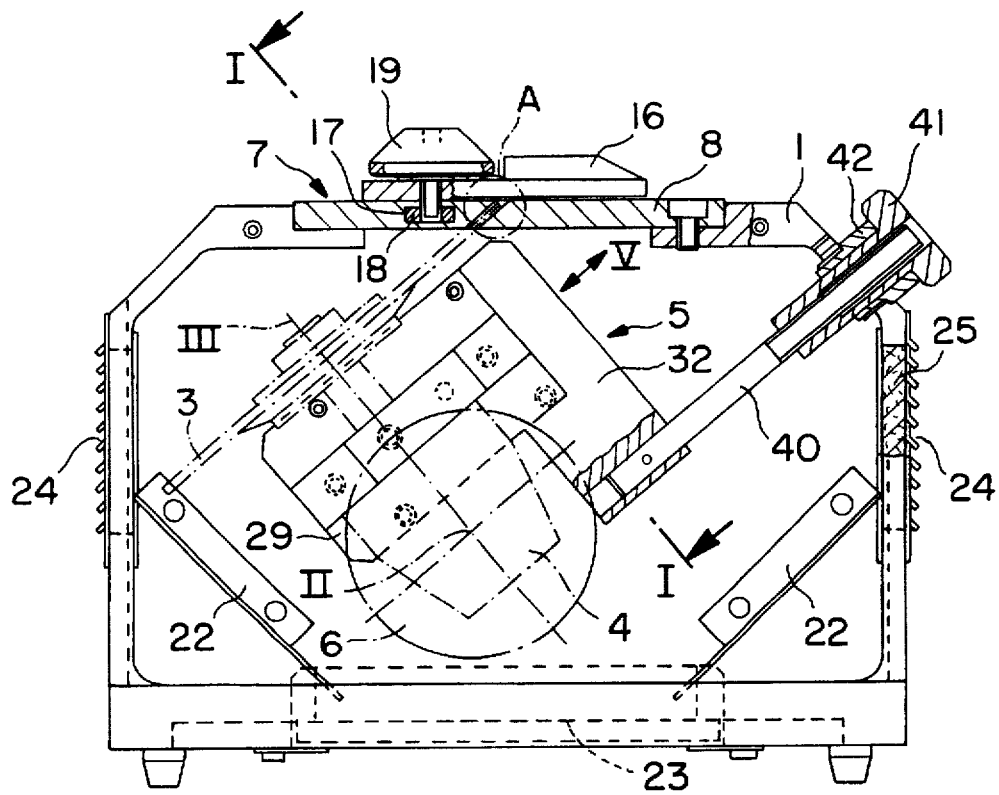
FIG. 1 is a side elevation, partially in section, of an apparatus in accordance with the invention.

In FIG. 1, there is shown an apparatus of the kind useful for removing excess material, such as spur bits and sprues, from workpieces, including a housing 1 enclosed at five of its sides by walls but open at a sixth side 2. Within the housing 1 there is provided a tool, shown, by way of example, as a cutting disk 3 operatively connected to a rotary power drive 4. The cutting disk 3 may be a flexible disk of the kind covered by an abrasion material. But other tools, such as grinding wheels or cones, rotary saws and the like, may, depending on operating conditions, be employed no less advantageously. Preferably, the power drive 4 is a common hand-held power tool which can easily be inserted into the housing 1 through the open side 2 thereof, for releasable attachment to a mounting bracket 5.

Figure 2:
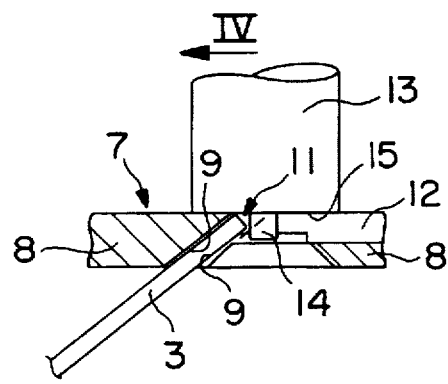
FIG. 2 is a detailed view, on an enlarged scale, of a section of the apparatus shown in FIG. 1.
Figure 3:
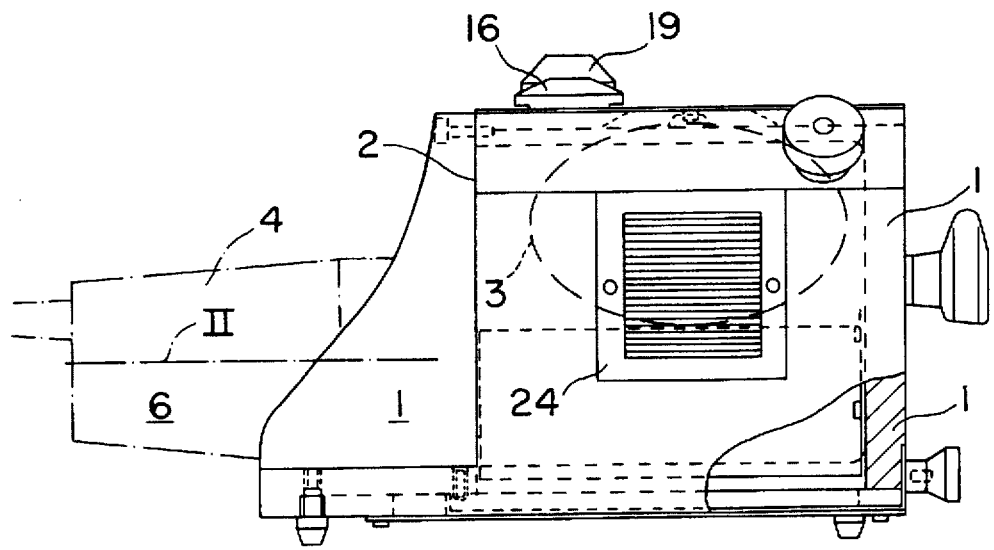
FIG. 3 is a side elevation of the apparatus.
Figure 4:
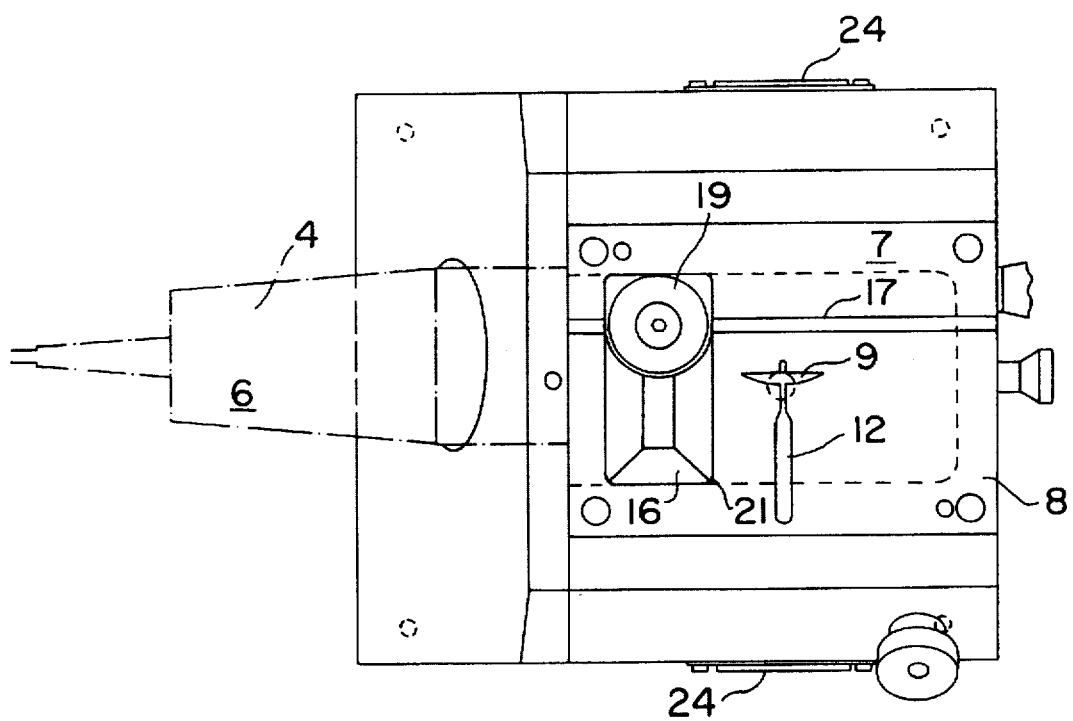
FIG. 4 is a top elevation of the apparatus.

The power tool 4 to which the cutting disk 3 is drivingly connected is a standard mass-produced item. The cutting disk 3 is disposed in parallel to an axis II. To accommodate the disposition of the axis of rotation III of the cutting disk 3 at a right angle relative to the handle 6 of the power tool 4, the latter is provided with an angular transmission. The power tool 4 is mounted within the housing 1 in an orientation which, as shown, places the plane of the cutting disk 3 at an inclination of about 45° relative to a support surface 7 of a workbench 8 covering the top of the housing 1. It will be understood that the mounting of the power tool 4 within the housing 1 may be adjustable to allow variations in the inclination of the cutting disk 3 between 0° and 90° and, preferably, between 5° and 90° relative to the support surface 7. Within the support surface 7 or workbench 8 there is provided a recess 9 (see FIGS. 2 and 4) in which there is disposed, without protruding beyond the support surface 7, a peripheral segment 11 of the cutting disk 3.

Additionally, there is provided within the support surface 7 or workbench 8 a slot or channel 12 disposed to intersect the cutting disk 3 and entering into the recess 9. As may be seen in FIG. 2, a workpiece 13 having at its lower axial surface 15 a spur bit 14 to be removed, has been placed on the support surface 7 by its lower axial surface 15, with the spur bit 14 extending into the channel 12, for movement on the support surface 7 in the direction of an arrow IV. As the spur bit 14 is guided along the channel 12, it will eventually come into contact with, and be removed by, the cutting disk 3. To prevent the resultant cut section of the axial surface 15 of the workpiece 13 from being furrowed or curved as a result of the peripheral curvature of the cutting tool 3, it may be advantageous to rotate the workpiece 13 by 90°, more or less, about its axis, during its movement across the cutting disk 3. The rotation may be done manually by an operator of the apparatus or by a fixture (not shown) turning the workpiece 13 in synchronism with its movement along the channel 12.

In order to facilitate the insertion of the spur bit 14 into the channel 12, there is provided upon the workbench 8 an abutment 16 having a protrusion seated in a T-shaped groove 17 which extends parallel to the recess 9. The abutment 16 is movable relative to the channel 12 and may be selectively arrested at different positions by a clamping bolt 19 threaded into a clamping nut 18 provided within the T-shaped groove 17, to accommodate workpieces 13 of different diameters. In order further to simplify insertion of the spur bit 14 into the channel 12, an inclined guide surface 21 is provided at the input side of the abutment 16, the width of the channel 12 being wider at this location than at its mouth into the recess 9.

Guide plates 22 are mounted within the housing 1 for guiding removed excess material and shavings as they drop down, into a removable waste receptacle 23. Moreover, within the side walls of the housing 1 there are provided vents 24 as well as dust and noise suppression filters 25, for the circulation of cooling air to, and the protection from dust of, the power drive 4 while also restricting noise emission from the interior of the housing 1.

Figure 5:
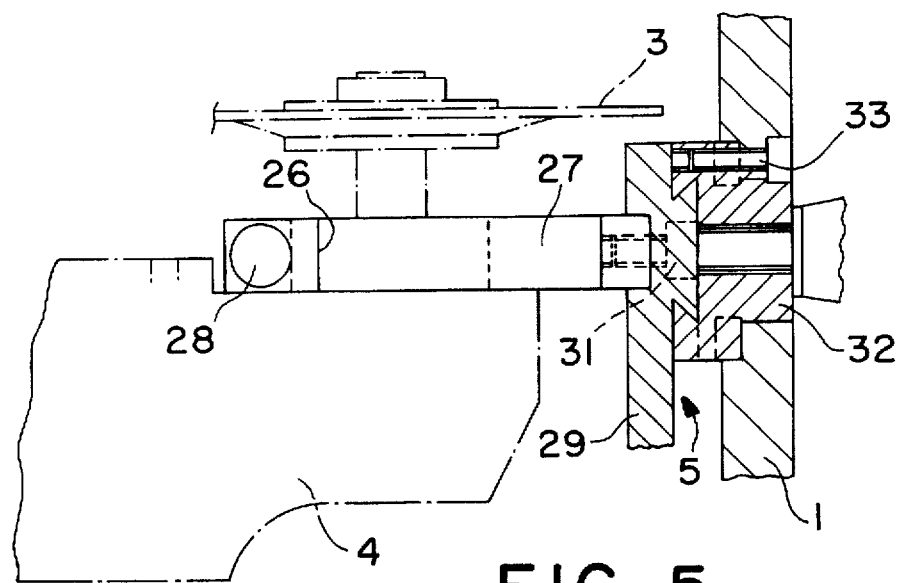
FIG. 5 is a view along section line I of FIG. 1.
Figure 6:
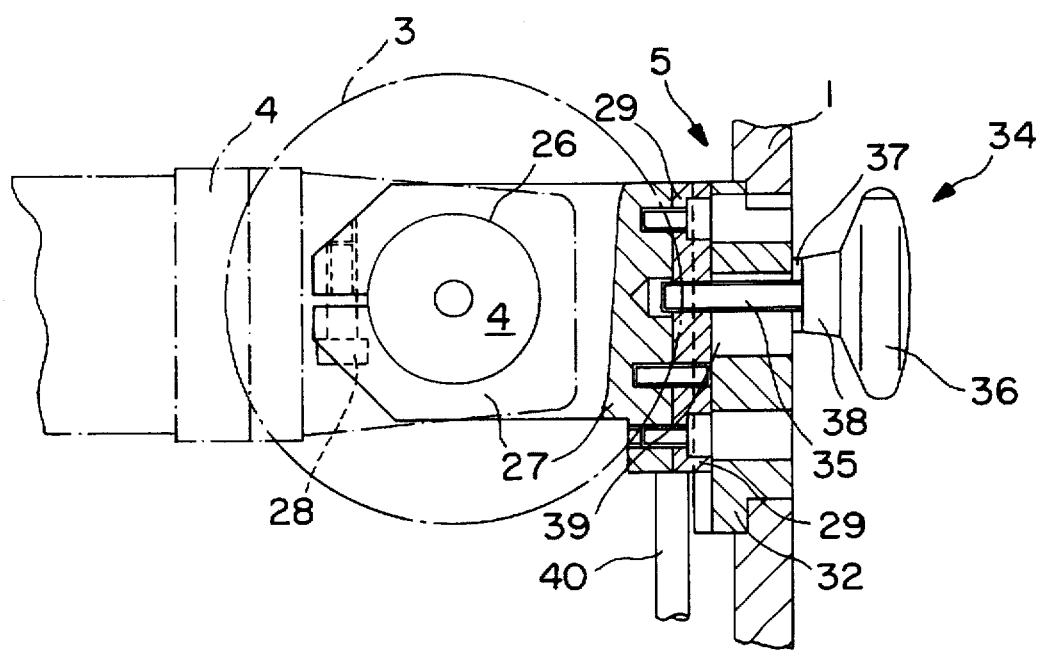
FIG. 6 is a view in partial section of the detail shown in FIG. 5.

As may be seen in FIGS. 5 and 6, the power tool 4 is provided with a mounting flange 26 clamped into the jaws of a socket or chuck 27 which is part of the mounting bracket 5 and which may be tightened by a clamping bolt 28. The clamping socket 27 is rigidly connected to a slide 29 by threaded bolts 31. The slide 29 is movably connected to a support plate 32 by a dovetail connection. The support plate 32 is rigidly mounted to the housing 1 by screws 33.

By virtue of the dovetail connection the slide 29 may be reciprocally moved relative to the mounting plate 32 in directions indicated by a double-headed arrow V (FIG. 1), for adjusting the position of the cutting disk 3 relative to the support surface 7. Such adjustment is indicated to compensate for wear-induced reductions in the diameter of the cutting disk 3 and, of course, each time a disk is replaced. Arresting and releasing the slide 29 relative to the support surface 32 may take place by a quick-release clamping arrangement 34 which is provided with a threaded spindle 35 engaging the slide 29 and a rotatable knob 36 seated against the housing 1 by a flange 38 and washer 37. The threaded spindle 35 protrudes through elongate apertures provided in the support plate 32, thus allowing movement of the slide 29, when released, relative to the support plate 32.

The sliding movement is imparted by an adjustment screw 40 attached to the slide 29 and an adjustment knob 41 telescopingly threaded onto the screw 40 and seated in a bush 42 seated in the workbench 8 (FIG. 1).

It will be appreciated that the apparatus in accordance with the invention offers a number of significant advantages. Not only may a great number of workpieces have excess material removed in a given unit of time, but because the tool does not protrude above the support surface 7 of the workbench 8, such removal may be carried out extraordinarily quickly and in a clean manner. For practical purposes, any kind of safety hazard has been removed, so that the apparatus may be operated by unskilled personnel. During operation of the apparatus, a spur bit, sprue or the like may be inserted into the channel 12 and will be removed by being moved into engagement with and across the tool 3 to yield a uniformly smooth surface. The operation is, therefore, quick, clean and safe.

In an advantageous embodiment of the invention, the abutment 16 which extends parallel, and is adjustable relative, to the channel 12, provides an additional guide means or alignment fixture for workpieces 13 of different diameters. This additional guide facilitates insertion into the channel 12 of the material to be removed from a workpiece.

In accordance with a further advantageous embodiment the rotational axis of the tool 3 is angularly disposed with respect to the workpiece support surface of the apparatus. At present, the preferred angle is about 45° but may be varied between 0° and 90°.

In yet another preferred embodiment the tool is a cutting disk 3 the plane of which is disposed relative to the support surface 7 at an angle selectively variable between a few degrees and up to 90°. The use of a cutting disk makes it possible to remove any excess material, such as a spur bit, by cutting at its base rather than grinding off the entire material. This results in significantly reduced shavings and less wear on the tool 3. Less wear of the tool 3 leads to fewer adjustments thereof. In addition, during operation the cutting disk 3 is subjected to forces which, regardless of the angular disposition of the tool 3, tend to deflect it slightly upwardly, which leads to the added advantage of a slight recess being formed in the surface previously occupied by a spur bit, for instance.

An additional advantage is obtained by utilizing, in accordance with the invention, a standard mass-produced hand-held power tool, mounted below the workbench, as a rotary drive for the tool. Suitable power tools such as, for instance, rotary sanders and the like, are produced in great quantities and are, therefore, relatively inexpensive. Since such hand-held tools are usually furnished with mounting brackets or flanges, they can easily be adapted for mounting to complementary structure of the apparatus.

Preferably, the power drive is mounted in the apparatus on a bracket which is movable to allow adjustments in the position of tool relative to the support surface.

Advantageously, the bracket comprises a slide to which the drive may be attached and which is movable relative to a support plate affixed to the workbench by a releasable clamping mechanism. By releasing the clamping mechanism, the position of the tool may be adjusted as required. The clamping mechanism prevents unintentional movements of the tool, such as might otherwise be induced by vibrations and other external forces.

In accordance with another advantageous embodiment of the invention a set screw may be provided for adjusting the position of the tool in a direction parallel to its rotational axis in the direction of the recess in the workbench. Regardless of whether the tool is a conical grinding tool or a cutting disk, access to it which is only possible by way of the channel in the workbench, is always accompanied by wear in a direction parallel to the rotational axis. Parallel movement of the rotational axis is, therefore, sufficient for periodically necessary adjustments.

In another advantageous embodiment of the invention, the clamping feature comprises a threaded spindle supported by the housing or a support plate which is connected to the slide and penetrates an elongate aperture extending in the direction of adjustment movement of the slide and provided in the support plate or in the housing.

In still another advantageous embodiment of the invention the tool is adjustable by an adjustment screw in directions parallel to its rotational axis and normal to the guide channel. In this manner, the center of the tool may be moved as close to the center of the channel as possible which significantly affects the complete removal of excess material. However, in most instances where a hand-held power tool is used, this may not be necessary.

The workbench in accordance with an improved embodiment of the invention comprises a housing for receiving or enclosing the tool, the housing additionally serving as a scrap or shavings collector provided with guide plates and a removable scrap receptacle. The guide plates effectively prevent scrap and shavings from dropping into corner sections of the housing whence their removal would be difficult. Given the spark inducing effect of the cutting disk, it may be desirable to provide a spark deflector shield (not shown) at an appropriate position of the housing.

Furthermore, it has been found to be advantageous to mount the drive within the housing. To provide for adequate cooling of the drive, vents may be provided in the side walls of the housing. By such an arrangement the interior of the housing would be protected from becoming overheated while it could also serve as a receptacle for the removed material.

It will be apparent to those skilled in the art that certain changes and modifications to the apparatus described supra are feasible which would not, however, remove it from the umbrella of protection provided by the appended claims.

What is claimed is:

1. An apparatus for removing excess material from a workpiece, comprising:

substantially planar workpiece support surface means having upper and lower sides with an opening penetrating therethrough and extending in predetermined direction;

guide means in said workpiece support surface means extending into said opening in a direction substantially normal to said predetermined direction, said guide means being adapted to receive said excess material for movement relative to said opening; and rotatably driveable tool means of substantially circular configuration mounted below said workpiece support surface means and comprising a peripheral material removal segment extending into said opening to a point below said upper side of said workpiece support surface means and intersecting said guide means.

2. The apparatus of claim 1, wherein said guide means comprises channel means provided in said workpiece upper side of said support surface means.

3. The apparatus of claim 2, further comprising abutment means extending above said upper side in substantially parallel alignment with said guide means and being selectively movable in directions normal thereto.

4. The apparatus of claim 3, wherein said tool means comprises axis of rotation disposed at an inclination relative to said support surface means and substantially normal to said predetermined direction.

5. The apparatus of claim 4, wherein means is provided for adjusting said axis of rotation at angles of inclination between 0° and 90°.

6. The apparatus of claim 5, wherein said tool means with peripheral cutting edge means comprises disk means.

7. The apparatus of claim 6, wherein said tool means comprises hand-held power tool means mounted to said lower side.

8. The apparatus of claim 7, wherein said power tool means comprises means for selectively moving said power tool means in panes normal and parallel to said axis of rotation.

9. The apparatus of claim 8, wherein said power tool means comprises a rotary power axis extending substantially normal to said axis of rotation.

10. The apparatus of claim 9, wherein said power tool means comprises slidably mounted bracket means operatively connected to threaded spindle means for selective movement of said rotatable tool means relative to said elongate opening.

11. The apparatus of claim 10, wherein said bracket means comprises clamping means for releasably securing said tool means on said support means.

12. The apparatus of claim 11, wherein said workpiece support surface means comprises a surface of a housing for receiving said rotatably drivable tool means therein.

13. The apparatus of claim 12, wherein said power tool means is mounted in said housing and wherein vent means is provided in said housing for circulating cooling air therein.

14. The apparatus of claim 13, wherein receptacle means for receiving removed excess material is provided in said housing.

15. The apparatus of claim 14, wherein guide plate means is provided in said housing intermediate said rotatably drivable tool means and said receptacle means.

* * * * *